United States Patent
Chiu

(10) Patent No.: US 9,791,610 B2
(45) Date of Patent: Oct. 17, 2017

(54) BACKLIGHT MODULE AND DISPLAY HAVING THE SAME

(71) Applicant: Wistron Corporation, New Taipei (TW)

(72) Inventor: Yu-Wei Chiu, New Taipei (TW)

(73) Assignee: Wistron Corporation, New Taipei (TW)

( * ) Notice: Subject to any disclaimer, the term of this patent is extended or adjusted under 35 U.S.C. 154(b) by 71 days.

(21) Appl. No.: 14/746,832

(22) Filed: Jun. 22, 2015

(65) Prior Publication Data

US 2016/0091651 A1    Mar. 31, 2016

(30) Foreign Application Priority Data

Sep. 29, 2014 (TW) .............................. 103133748 A

(51) Int. Cl.
*G02F 1/1335* (2006.01)
*F21V 8/00* (2006.01)

(52) U.S. Cl.
CPC ..... *G02B 6/0026* (2013.01); *G02F 1/133615* (2013.01)

(58) Field of Classification Search
CPC ........................ G02F 1/133615; G02B 6/0026
See application file for complete search history.

(56) References Cited

U.S. PATENT DOCUMENTS

2012/0057103 A1\* 3/2012 Cao ................... G02F 1/133603
349/69
2012/0075837 A1\* 3/2012 Um ..................... G02B 6/0023
362/84

FOREIGN PATENT DOCUMENTS

CN           102565921         7/2012

OTHER PUBLICATIONS

"Office Action of Taiwan Counterpart Application", dated Sep. 2, 2015, with English translation thereof, p. 1-p. 6.

\* cited by examiner

*Primary Examiner* — Kendrick Hsu
(74) *Attorney, Agent, or Firm* — Jianq Chyun IP Office

(57) ABSTRACT

A backlight module including a back plate, a light guide plate, a light-penetration layer, and a light source is provided. The light guide plate is disposed on the back plate and has a light incident surface and a light-emitting surface. The light-penetration layer is disposed on the light incident surface and adapted to absorb a light in a wavelength range. The light source is disposed on the back plate and faces the light incident surface, wherein the light source is adapted to provide a light. After the light passes through the light-penetration layer, the light enters the light guide plate from the light incident surface and is emitted from the light-emitting surface. In addition, a display having the backlight module is also provided.

20 Claims, 2 Drawing Sheets

BACKLIGHT MODULE AND DISPLAY HAVING THE SAME

CROSS-REFERENCE TO RELATED APPLICATION

This application claims the priority benefit of Taiwan application serial no. 103133748, filed on Sep. 29, 2014. The entirety of the above-mentioned patent application is hereby incorporated by reference herein and made a part of this specification.

BACKGROUND OF THE INVENTION

Field of the Invention

The invention relates to a backlight module, and more particularly, to a backlight module having a light-penetration layer capable of absorbing a light in a specific wavelength range and a display having the backlight module.

Description of Related Art

The current electronic device often uses a flat display module to display a screen, wherein the technique of a liquid crystal display module is more mature and popular. However, since the display panel of the liquid crystal display module itself cannot emit light, a backlight module is provided below the display panel to provide the light needed for a display screen.

The backlight module can use a light-emitting diode (LED) as the light source, and the blue light in the light provided by the LED is passed through to the retina and the macula of the human eye, thus readily causing various eye diseases such as cataract, glaucoma, myopia, and floaters. The anti-blue light design of the current electronic device often includes the adhesion of an anti-blue light protective film on the display surface thereof so as to filter the blue light in the backlight of the electronic device. However, dirt or damage is readily generated on the protective film due to touching or a touch operation performed by a user, thus affecting display quality of the screen. Moreover, the protective film needs to cover a large-area display region of the electronic device to achieve the effect of anti-blue light, and the production costs thereof are therefore higher. In addition, in the current anti-blue light protective film, a metal particle is often used as the anti-blue light material instead of a natural substance. As a result, the anti-blue light protective film cannot be decomposed naturally and therefore does not meet environmental needs.

SUMMARY OF THE INVENTION

The invention provides a backlight module achieving the effect of anti-blue light via a light-penetration layer, wherein dirt or damage is not readily generated on the light-penetration layer and production costs can be saved.

A backlight module of the invention includes a back plate, a light guide plate, a light-penetration layer, and a light source. The light guide plate is disposed on the back plate and has a light incident surface and a light-emitting surface. The light-penetration layer is disposed on the light incident surface and adapted to absorb a light in a wavelength range. The light source is disposed on the back plate and faces the light incident surface, wherein the light source is adapted to provide a light. After the light passes through the light-penetration layer, the light enters the light guide plate from the light incident surface and is emitted from the light-emitting surface.

A display of the invention includes a display panel and a backlight module. The backlight module includes a back plate, a light guide plate, a light-penetration layer, and a light source. The light guide plate is disposed on the back plate and has a light incident surface and a light-emitting surface, and the light-emitting surface faces the display panel. The light-penetration layer is disposed on the light incident surface and adapted to absorb a light in a wavelength range. The light source is disposed on the back plate and faces the light incident surface, wherein the light source is adapted to provide a light. After the light passes through the light-penetration layer, the light enters the light guide plate from the light incident surface and is emitted from the light-emitting surface.

In an embodiment of the invention, the light-penetration layer includes an anti-blue light substance, and the anti-blue light substance includes at least one of lutein and zeaxanthin.

In an embodiment of the invention, the material of the light-penetration layer includes an anti-blue light substance and a light-penetration structure, and the light-penetration structure encapsulates the anti-blue light substance.

In an embodiment of the invention, the material of the light-penetration structure includes a heat-curing material or a light-curing material.

In an embodiment of the invention, the backlight module includes an adhesive layer, wherein the adhesive layer is adhered between the light-penetration layer and the light incident surface.

In an embodiment of the invention, the material of the adhesive layer includes an optical clear adhesive (OCA) or an optical clear resin (OCR).

In an embodiment of the invention, the material of the adhesive layer includes a heat-curing material or a light-curing material.

In an embodiment of the invention, the light incident surface is a rough surface.

In an embodiment of the invention, the light-penetration layer is an anti-blue light layer.

In an embodiment of the invention, the wavelength range is between 380 nm and 495 nm.

In an embodiment of the invention, the light source includes a light-emitting diode device.

Based on the above, in the backlight module of the invention, a light-penetration layer capable of absorbing a light in a specific wavelength range is disposed on the light incident surface of the light guide plate, so as to absorb the blue light in a light provided by the light source via the light-penetration layer before the light enters the light guide plate from the light incident surface. As a result, damage to the eye of the user from blue light is prevented. Since the light-penetration layer is not disposed on a large-area display region of an electronic device containing the backlight module, but is disposed on a small-area light incident surface of the light guide plate, the effect of anti-blue light can be achieved via the light-penetration layer having a smaller size so as to save production costs. Moreover, since the light-penetration layer is disposed on the light incident surface of the light guide plate and is not exposed to the outside of the electronic device, generation of dirt or damage to the traditional anti-blue light protective film due to touching or a touch operation performed by the user does not occur.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
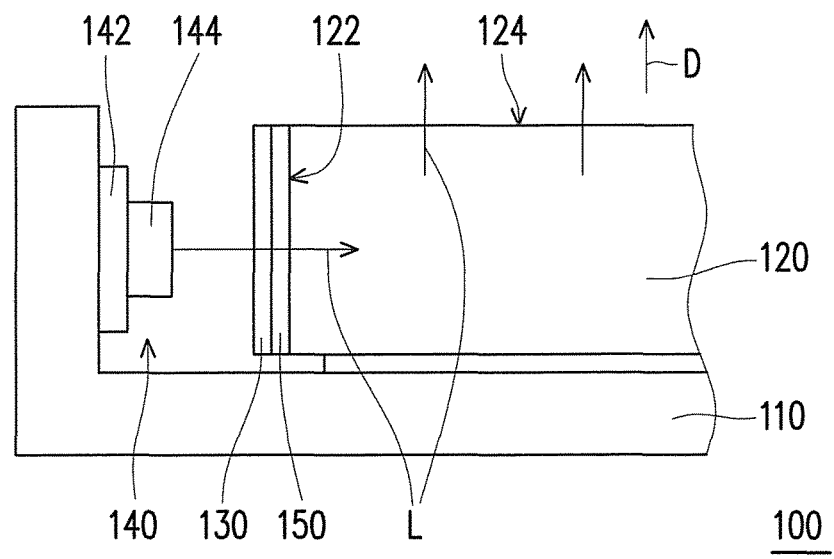
FIG. 1 is a side view of a portion of a backlight module of an embodiment of the invention.
Figure 2:
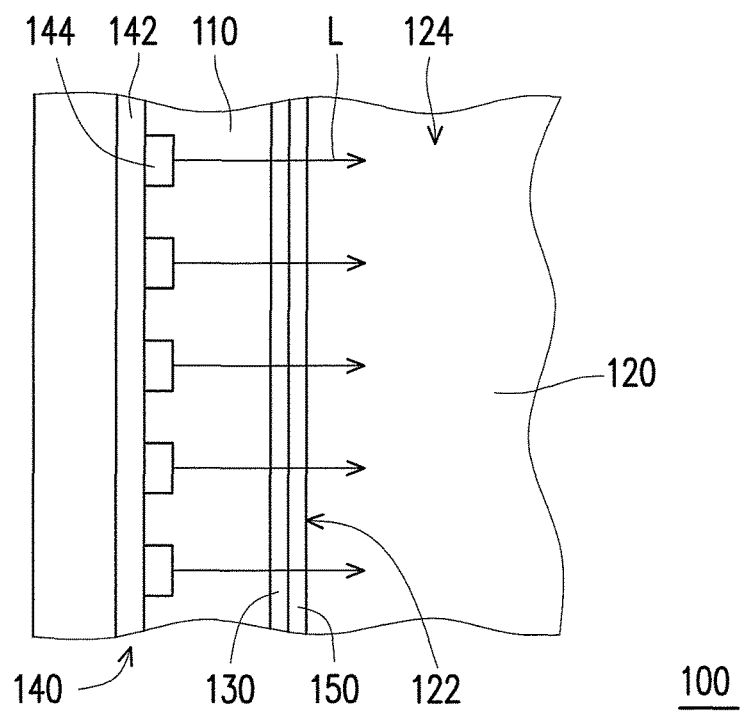
FIG. 2 is a top view of the backlight module of FIG. 1.

FIG. 1 is a side view of a portion of a backlight module of an embodiment of the invention. FIG. 2 is a top view of the backlight module of FIG. 1. Referring to FIG. 1 and FIG. 2, a backlight module 100 of the present embodiment includes a back plate 110, a light guide plate 120, a light-penetration layer 130, and a light source 140. The light guide plate 120 is disposed on the back plate 110 and has a light incident surface 122 and a light-emitting surface 124. The light-penetration layer 130 is disposed on the light incident surface 122 of the light guide plate 120 and is adapted to absorb a light in a wavelength range, wherein the wavelength range is between, for instance, 380 nm and 495 nm, that is, the light-penetration layer 130 is, for instance, an anti-blue light layer. The light source 140 is disposed on the back plate 110 and faces the light incident surface 122 of the light guide plate 120.

The light source 140 is, for instance, a light-emitting diode light bar and includes a substrate 142 and a plurality of light-emitting diode devices 144 disposed on the substrate 142, and the light-emitting diode strip is disposed in a manner parallel to the light incident surface 122. The light-emitting diode devices 144 of the light source 140 are adapted to provide a light L to the light guide plate 120. After the light L passes through the light-penetration layer 130, the light L enters the light guide plate 120 from the light incident surface 122 of the light guide plate 120 and is emitted from the light-emitting surface 124 of the light guide plate 120 to provide light to the display module of an electronic device. In the light transmission process, the light-penetration layer 130 first absorbs at least a portion of the blue light in the light L, and then the light L is emitted from the light-emitting surface 124 of the light guide plate 120 so as to reduce the probability of damage to the eye of a user generated due to blue light.

In general, the area of the light incident surface of the light guide plate is much less than the area of the display surface of the corresponding electronic device. Since the light-penetration layer 130 is not disposed on a large-area display surface of an electronic device containing the backlight module 100, but is disposed on a small-area light incident surface 122 of the light guide plate 120, the effect of anti-blue light can be achieved via the light-penetration layer 130 having a smaller size so as to save production costs. Moreover, since the light-penetration layer 130 is disposed on the light incident surface 122 of the light guide plate 120 and is not exposed to the outside of the electronic device, generation of dirt or damage to the traditional anti-blue light protective film due to touching or a touch operation performed by a user does not occur.

In the present embodiment, the light incident surface 122 is located on a side of the light guide plate 120 and the extension direction thereof is parallel to a light-emitting direction D of the light L. However, the invention is not limited thereto. The light incident surface 122 can also be located in other positions of the light guide plate 120 and have other suitable extension directions, and the light source 140 is correspondingly disposed in other suitable positions to be aligned with the light incident surface 122.

In general, violet light in a light provided by the light-emitting diode device of the backlight module causes damage to internal members of the electronic device, thus reducing the service life thereof. Accordingly, the light-penetration layer 130 of the present embodiment can, for instance, absorb a light having a wavelength between 380 nm and 495 nm, and the wavelength range includes wavelengths of violet light, blue light, and indigo light. Accordingly, the light-penetration layer 130 can absorb at least a portion of violet light in the light L emitted from the light-emitting diode devices 144 before the light L irradiates the internal members of the electronic device so as to reduce the probability of damage to the internal members of the electronic device due to violet light irradiation.

Figure 3:
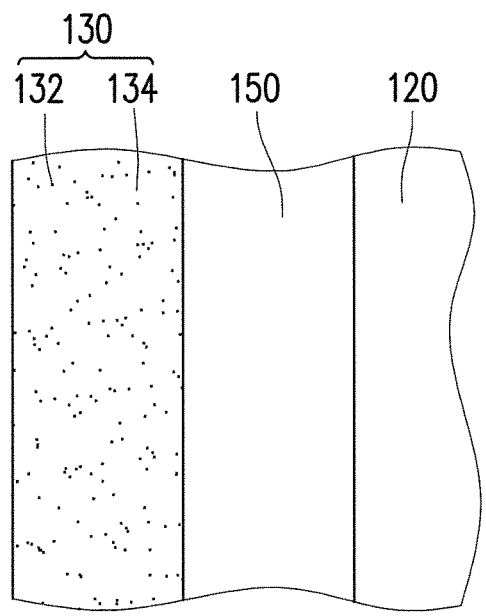
FIG. 3 is an enlarged view of a portion of the backlight module of FIG. 1.

FIG. 3 is an enlarged view of a portion of the backlight module of FIG. 1. Referring to FIG. 3, the light-penetration layer 130 of the present embodiment includes an anti-blue light substance 132 and a light-penetration structure 134. The anti-blue light substance 132 is, for instance, a complex particle formed by at least one of lutein and zeaxanthin capable of absorbing violet light, blue light, and indigo light, and the light-penetration structure 134 encapsulates the anti-blue light substance 132 and is adhered to the light incident surface 122 of the light guide plate 120. In particular, lutein and zeaxanthin are isomers, and the chemical formula is, for instance, $C_{40}H_{56}O_2$. Since the material of the light-penetration layer 130 contains a natural substance (lutein and zeaxanthin), the anti-blue light substance 132 in a discarded backlight module can be decomposed naturally so as to meet environmental needs.

In the present embodiment, the light-penetration layer 130 is, for instance, fixed on the light incident surface 122 of the light guide plate 120 via an adhesion method. Specifically, the backlight module 100 of the present embodiment includes an adhesive layer 150, and the adhesive layer 150 is adhered between the light-penetration layer 130 and the light incident surface 122 of the light guide plate 120. The material of the adhesive layer 150 is, for instance, an optical clear adhesive, an optical clear resin, or other suitable light-penetration adhesive materials. The invention does not limit the material of the adhesive layer 150.

More specifically, the material of the light-penetration structure 134 and the material of the adhesive layer 150 can include a light-penetration heat-curing material to prevent dissolution of the light-penetration structure 134 and the adhesive layer 150 due to high temperature generated by the operation of an electronic device. In other embodiments, the material of the light-penetration structure 134 and the material of the adhesive layer 150 can also include a light-penetration light-curing material or other suitable light-penetration materials. The invention does not limit the material of the light-penetration structure 134 and the material of the adhesive layer 150.

In the above embodiments, the light incident surface 122 of the light guide plate 120 is shown as a flat surface, but the invention is not limited thereto. In other embodiments, the light incident surface 122 of the light guide plate 120 can be designed as a rough surface to increase the binding capacity between the adhesive layer 150 and the light incident surface 122 to prevent the adhesive layer 150 and the light-penetration layer 130 from falling off of the light incident surface 122 of the light guide plate 120. The roughness of the rough surface can be changed according to design need. The invention does not limit the roughness of the rough surface.

Figure 4:
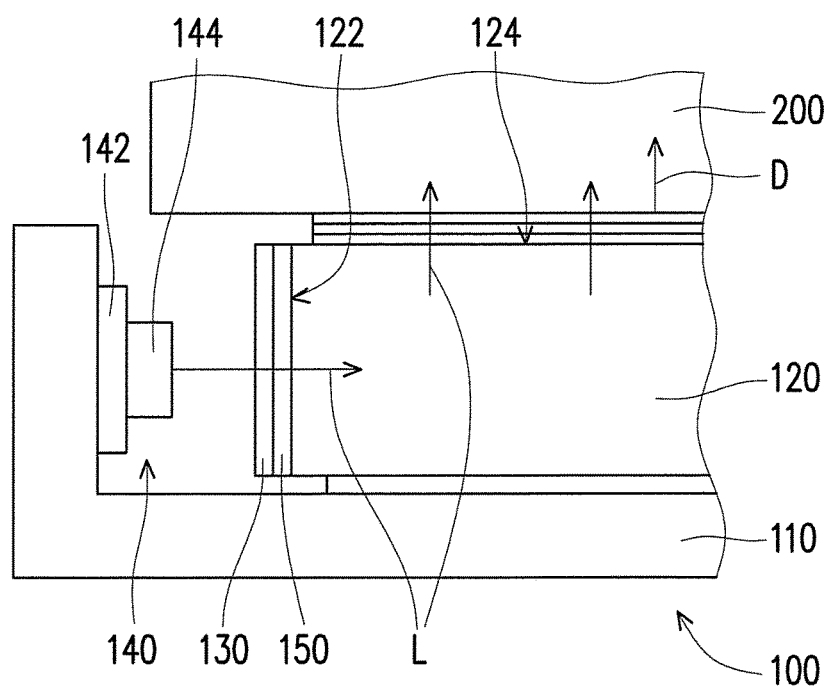
FIG. 4 shows the backlight module of FIG. 1 applied in a display.

FIG. 4 shows the backlight module of FIG. 1 applied in a display. Referring to FIG. 4, the backlight module 100 of the present embodiment can be combined with a display panel 200 to form a display 50, wherein the light-emitting surface 124 of the light guide plate 120 faces the display panel 200 to provide the light needed for the display panel 200 to display a screen. The display 50 is, for instance, an electronic device having display function such as an electronic whiteboard, a notebook computer, a smart phone, or a tablet computer. The invention does not limit the display.

Based on the above, in the backlight module of the invention, a light-penetration layer capable of absorbing a light in a specific wavelength range is disposed on the light-incident surface of the light guide plate so as to absorb the blue light in a light provided by the light source via the light-penetration layer before the light enters the light guide plate from the light incident surface. As a result, damage to the eye of a user from blue light is prevented. Since the light-penetration layer is not disposed on a large-area display surface of an electronic device containing the backlight module, but is disposed on a small-area light incident surface of the light guide plate, the effect of anti-blue light can be achieved via the light-penetration layer having a smaller size so as to save production costs. Moreover, since the light-penetration layer is disposed on the light incident surface of the light guide plate and is not exposed to the outside of the electronic device, generation of dirt or damage to the traditional anti-blue light protective film due to touching or a touch operation performed by the user does not occur. Moreover, a light-penetration layer capable of absorbing violet light, blue light, and indigo light is used, such that the light-penetration layer can absorb at least a portion of violet light in a light emitted from the light-emitting diode devices before the light irradiates the internal members of the electronic device so as to prevent damage to the internal members of the electronic device due to violet light irradiation. Further, the material of the light-penetration layer can contain a natural substance (lutein and zeaxanthin), such that the anti-blue light substance in a discarded backlight module can be decomposed naturally so as to meet environmental needs.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A backlight module, comprising:
a back plate;
a light guide plate disposed on the back plate and having a light incident surface and a light-emitting surface;
a light-penetration layer disposed on the light incident surface and adapted to absorb a blue light in a wavelength range without changing the wavelength range of the blue light; and
a light source disposed on the back plate and facing the light incident surface, wherein the light source is adapted to provide a light, and after the light passes through the light-penetration layer, the light enters the light guide plate from the light incident surface and is emitted from the light-emitting surface,
wherein the light-penetration layer comprises an anti-blue light substance.

2. The backlight module of claim 1, wherein the anti-blue light substance comprises at least one of lutein and zeaxanthin.

3. The backlight module of claim 1, wherein a material of the light-penetration layer comprises a light-penetration structure, and the light-penetration structure encapsulates the anti-blue light substance.

4. The backlight module of claim 3, wherein a material of the light-penetration structure comprises a heat-curing material or a light-curing material.

5. The backlight module of claim 1, further comprising an adhesive layer, wherein the adhesive layer is adhered between the light-penetration layer and the light incident surface.

6. The backlight module of claim 5, wherein a material of the adhesive layer comprises an optical clear adhesive or an optical clear resin.

7. The backlight module of claim 5, wherein a material of the adhesive layer comprises a heat-curing material or a light-curing material.

8. The back light module of claim 1, wherein the light incident surface is a rough surface.

9. The backlight module of claim 1, wherein the light-penetration layer is an anti-blue light layer.

10. The backlight module of claim 1, wherein the wavelength range is between 380 nm and 495 nm.

11. A display, comprising:
a display panel; and
a backlight module, comprising:
a back plate;
a light guide plate disposed on the back plate and having a light incident surface and a light-emitting surface, wherein the light-emitting surface faces the display panel;
a light-penetration layer disposed on the light incident surface and adapted to absorb a blue light in a wavelength range without changing the wavelength range of the blue light; and
a light source disposed on the back plate and facing the light incident surface, wherein the light source is adapted to provide a light, and after the light passes through the light-penetration layer, the light enters the light guide plate from the light incident surface and is emitted from the light-emitting surface,
wherein the light-penetration layer comprises an anti-blue light substance.

12. The display of claim 11, wherein the anti-blue light substance comprises at least one of lutein and zeaxanthin.

13. The display of claim 11, wherein a material of the light-penetration layer comprises a light-penetration structure, and the light-penetration structure encapsulates the anti-blue light substance.

14. The display of claim 13, wherein a material of the light-penetration structure comprises a heat-curing material or a light-curing material.

15. The display of claim 11, wherein the backlight module comprises an adhesive layer, and the adhesive layer is adhered between the light-penetration layer and the light incident surface.

16. The display of claim 15, wherein a material of the adhesive layer comprises an optical clear adhesive or an optical clear resin.

17. The display of claim 15, wherein a material of the adhesive layer comprises a heat-curing material or a light-curing material.

18. The display of claim 11, wherein the light incident surface is a rough surface.

19. The display of claim 11, wherein the light-penetration layer is an anti-blue light layer.

20. The display of claim 11, wherein the wavelength range is between 380 nm and 495 nm.

* * * * *